US008103628B2

(12) United States Patent
Howe et al.

(10) Patent No.: US 8,103,628 B2
(45) Date of Patent: Jan. 24, 2012

(54) DIRECTED PLACEMENT OF DATA IN A REDUNDANT DATA STORAGE SYSTEM

(75) Inventors: John Howe, Saratoga, CA (US); Alexander Mitaru, Beaverton, OR (US); Charles Morris, San Jose, CA (US); Don Harschadath Wanigasekara-Mohotti, Santa Clara, CA (US)

(73) Assignee: Harmonic Inc., San Jose, CA (US)

( * ) Notice: Subject to any disclaimer, the term of this patent is extended or adjusted under 35 U.S.C. 154(b) by 401 days.

(21) Appl. No.: 12/100,302

(22) Filed: Apr. 9, 2008

(65) Prior Publication Data

US 2009/0259665 A1    Oct. 15, 2009

(51) Int. Cl.
G06F 7/00 (2006.01)
G06F 17/00 (2006.01)
(52) U.S. Cl. ........ 707/626; 707/633; 707/635; 709/201; 709/213; 709/226
(58) Field of Classification Search .................. 707/626, 707/619, 616, 623, 633, 635; 709/220, 223, 709/227, 201, 213, 226
See application file for complete search history.

(56) References Cited

U.S. PATENT DOCUMENTS

| 5,519,855 | A | 5/1996 | Neeman et al. |
| 5,583,995 | A | 12/1996 | Gardner et al. |
| 5,881,311 | A | 3/1999 | Woods |
| 5,893,920 | A | 4/1999 | Shaheen et al. |
| 5,928,327 | A | 7/1999 | Wang et al. |
| 6,374,336 | B1 | 4/2002 | Peters et al. |
| 6,415,373 | B1 | 7/2002 | Peters et al. |
| 6,449,688 | B1 | 9/2002 | Peters et al. |
| 6,597,956 | B1 | 7/2003 | Aziz et al. |
| 6,606,690 | B2 * | 8/2003 | Padovano ..................... 711/148 |
| 6,647,479 | B1 | 11/2003 | Laws |
| 6,665,675 | B1 * | 12/2003 | Mitaru ......................... 711/220 |
| 6,760,808 | B2 | 7/2004 | Peters et al. |
| 6,779,202 | B1 * | 8/2004 | Alldredge ..................... 711/220 |
| 6,799,202 | B1 * | 9/2004 | Hankinson et al. ........... 709/219 |
| 7,054,927 | B2 * | 5/2006 | Ulrich et al. .................. 709/223 |
| 7,055,014 | B1 * | 5/2006 | Pawlowski et al. .......... 711/202 |
| 7,092,977 | B2 | 8/2006 | Leung et al. |

(Continued)

OTHER PUBLICATIONS

Andre Brinkmann & Sascha Effert—"Redundant Data Plecement Strategies for Clusters Storage Environments"—Computer Science, vol. 5401/2008, Springer Verlag 2008 (pp. 551-554).*

(Continued)

Primary Examiner — John E Breene
Assistant Examiner — Anh Ly
(74) Attorney, Agent, or Firm — Hickman Palermo Truong & Becker (57) ABSTRACT

A data processing apparatus, comprising a metadata store storing information about files that are stored in a distributed data storage system, and comprising a class database; one or more processing units; logic configured for receiving and storing in the class database a definition of a class of data storage servers comprising one or more subclasses each comprising one or more server selection criteria; associating the class with one or more directories of the data storage system; in response to a data client storing a data file in a directory, binding the class to the data file, determining and storing a set of identifiers of one or more data storage servers in the system that match the server selection criteria, and providing the set of identifiers to the data client.

26 Claims, 6 Drawing Sheets

U.S. PATENT DOCUMENTS

| | | | |
|---|---|---|---|
| 7,111,115 B2 | 9/2006 | Peters et al. | |
| 7,209,967 B2 | 4/2007 | Kitamura | |
| 7,210,091 B2 | 4/2007 | Stouffer et al. | |
| 7,225,211 B1* | 5/2007 | Colgrove et al. | 707/693 |
| 7,395,536 B2* | 7/2008 | Verbeke et al. | 709/201 |
| 7,487,309 B2 | 2/2009 | Peters et al. | |
| 7,533,141 B2* | 5/2009 | Nadgir et al. | 709/200 |
| 7,574,527 B1* | 8/2009 | Tormasov et al. | 709/243 |
| 7,685,183 B2* | 3/2010 | Pace et al. | 707/610 |
| 7,716,180 B2* | 5/2010 | Vermeulen et al. | 707/626 |
| 7,739,233 B1* | 6/2010 | Ghemawat et al. | 707/610 |
| 7,739,239 B1* | 6/2010 | Cormie et al. | 707/626 |
| 2002/0083118 A1* | 6/2002 | Sim | 709/105 |
| 2002/0124006 A1 | 9/2002 | Parnell | |
| 2002/0133491 A1* | 9/2002 | Sim et al. | 707/10 |
| 2002/0147815 A1* | 10/2002 | Tormasov et al. | 709/226 |
| 2003/0033308 A1 | 2/2003 | Patel et al. | |
| 2003/0037187 A1 | 2/2003 | Hinton et al. | |
| 2004/0088380 A1* | 5/2004 | Chung et al. | 709/219 |
| 2004/0098447 A1* | 5/2004 | Verbeke et al. | 709/201 |
| 2004/0148326 A1* | 7/2004 | Nadgir et al. | 709/200 |
| 2004/0186854 A1 | 9/2004 | Choi | |
| 2005/0216428 A1* | 9/2005 | Yagawa | 707/1 |
| 2006/0123062 A1* | 6/2006 | Bobbitt et al. | 707/200 |
| 2006/0206603 A1 | 9/2006 | Rajan et al. | |
| 2007/0185934 A1 | 8/2007 | Cannon | |
| 2007/0198593 A1* | 8/2007 | Prahlad et al. | 707/200 |
| 2007/0214183 A1* | 9/2007 | Howe et al. | 707/200 |
| 2007/0226224 A1* | 9/2007 | Wanigasekara-Mohotti et al. | 707/10 |
| 2008/0028048 A1* | 1/2008 | Shekar et al. | 709/220 |

OTHER PUBLICATIONS

Gunawi et al.—"Deconstructing Commodity Storage Clusters"—Proceedings of the 32th Annual International Symposium on Computer Architecture, ACM SIGARCH, vol. 13, Issue 2, May 2005 (pp. 1-12).*

Patent Cooperation Treaty ("PCT"), "European Search Report," PCT/US2009/40007, dated Oct. 29, 2009 received on Nov. 9, 2009, 10 pages.

Current Claims from PCT application US2009/40007, filed Apr. 9, 2009, 8 pages.

J. MacCormick et al., "Kinesis: A New Approach to Replica Placement in Distributed Storage Systems," 4 ACM Transactions on Storage 4, pp. 11:1-11:28, published by ACM, Inc., New York, NY, Jan. 2009.

Redhat, "Redhat linux 6.2: The Official Red Hat Linux Reference Guide", Available Jan. 2002, 7 pages.

Cabrera, L. et al., "Swift: Using Distributed Disk Striping to Provide High I/O Data Rates", Technical Report: UCSC-CRL-91-46, 1991, pp. 1-21.

Tewari, R. et al., "High Availability in Clustered Multimedia Servers", Proceedings of the 12th International Conference on Data Engineering, 1996, pp. 645-654.

Birrell, A. et al., "A Universal File Server", IEEE Transactions on Software Engineering, vol. SE-6, No. 5, Sep. 1980, pp. 450-453.

Ghemawat, S. et al., "The Google File System", SOSP 2003, Bolton Landing, NY, Oct. 19-22, 2003, pp. 1-15.

Gibson, G. et al., "A Cost-Effective, High-Bandwidth Storage Architecture", Proceedings of the 8th Conference on Architectural Support for Programming Languages and Operating Systems, 1998, pp. 1-12.

Anderson, T. et al., "Serverless Network File Systems", SIGOPS '95, 1995, pp. 109-126.

Hartman, J. et al., "The Zebra Striped Network File System", ACM Transactions on Computer Systems, vol. 13, No. 3, Aug. 1995, pp. 274-310.

Soltis, S. et al., "The Global File System", Appears in the Proceedings of the $5^{th}$ NASA Goddard Space flight Center Conference on Mass Storage Systems and Technologies, College Park, MD, Sep. 17-19, 1996, pp. 1-23.

Thekkath, C. et al., "Frangipani: A Scalable Distributed File System", ACM SIGOPS Operating Systems Review, vol. 31, Issue 5, Dec. 1997, pp. 224-237.

Liskov, B. "Replication in the Harp File System", Proceedings of the 13th ACM Symposium on Operating Systems Principles, Pacific Grove, CA, 1991, pp. 226-238.

Patterson, D. et al., "A Case for Redundant Arrays of Inexpensive Disks (RAID)", Proceedings of the 1988 ACM SIGMOD International Conference on Management of Data, Chicago, IL, 1988, pp. 109-116.

Schmuck, F. et al., "GPFS: A Shared-Disk File System for Large Computing Clusters", Proceedings of the Conference on File and Storage Technologies (FAST'02), Jan. 2002, Monterey, CA, pp. 231-244.

Arpaci-Dusseau, R. et al., "Cluster I/O with River: Making the Fast Case Common", Proceedings of the 6th Workshop on I/O in Parallel and Distributed Systems, Atlanta, GA, 1999, pp. 10-22.

Howard, J. et al., "Scale and Performance in a Distributed File System", ACM Transactions on Computer Systems (TOCS), vol. 6, Issue 1, Feb. 1988, pp. 51-81.

* cited by examiner

DIRECTED PLACEMENT OF DATA IN A REDUNDANT DATA STORAGE SYSTEM

CROSS-REFERENCE TO RELATED APPLICATIONS

The disclosure is generally related to U.S. application Ser. No. 11/371,393, filed Mar. 8, 2006, of John Howe et al., entitled "Methods for Dynamic Partitioning of a Redundant Data Fabric," the entire contents of which is hereby incorporated by reference as if fully set forth herein.

TECHNICAL FIELD

The present disclosure generally relates to computer data storage.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a distributed data storage system, where particular data is stored may affect data retrieval time, especially in systems that deliver real-time data such as video data. US Patent Publication 2007-0214183-A1 describes a distributed data storage system that can place redundant data images by globally optimizing the availability selection criteria over all servers. Distributed data storage also may be implemented using RAID (Redundant Array of Inexpensive Drives), NAS (Network Attached Storage), and SAN (Storage Area Network). Examples of distributed filesystems include the HP Lustre File System, SGI Clustered Extensible File System (CXFS), Veritas File System (VxFS), Google File System (GFS), Omneon Extended File System (EFS), Oracle Cluster File System (OCFS), and the Hadoop Distributed File System (HDFS). Distributed hardware systems include Isilon, Panasas, Avid ISIS.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview In an embodiment, a data processing apparatus comprises a metadata store storing information about files that are stored in a distributed data storage system, and comprising a class database; one or more processing units; logic configured for receiving and storing in the class database a definition of a class of data storage servers comprising one or more subclasses each comprising one or more server selection criteria; associating the class with one or more directories of the data storage system; in response to a data client storing a data file in a directory, binding the class to the data file, determining and storing a set of identifiers of one or more data storage servers in the system that match the server selection criteria, and providing the set of identifiers to the data client.

In other embodiments, the invention encompasses a computer-implemented method and a computer-readable medium configured to carry out the foregoing steps.

In an embodiment, a replication framework is provided to control the placement and migration of file data within a distributed storage system. Control over data placement is useful to leverage differences in servers in a heterogeneous server cluster supporting a distributed file system. Control over data placement also allows files to expand within specific server partitions. Control over data placement also can help localize file repair within a redundant data fabric.

Although certain embodiments are described in the context of storing data files, the techniques in this disclosure also can be applied to the placement of distributed applications among intelligent storage elements of a distributed storage system.

2.0 Structural and Functional Overview

Figure 1:
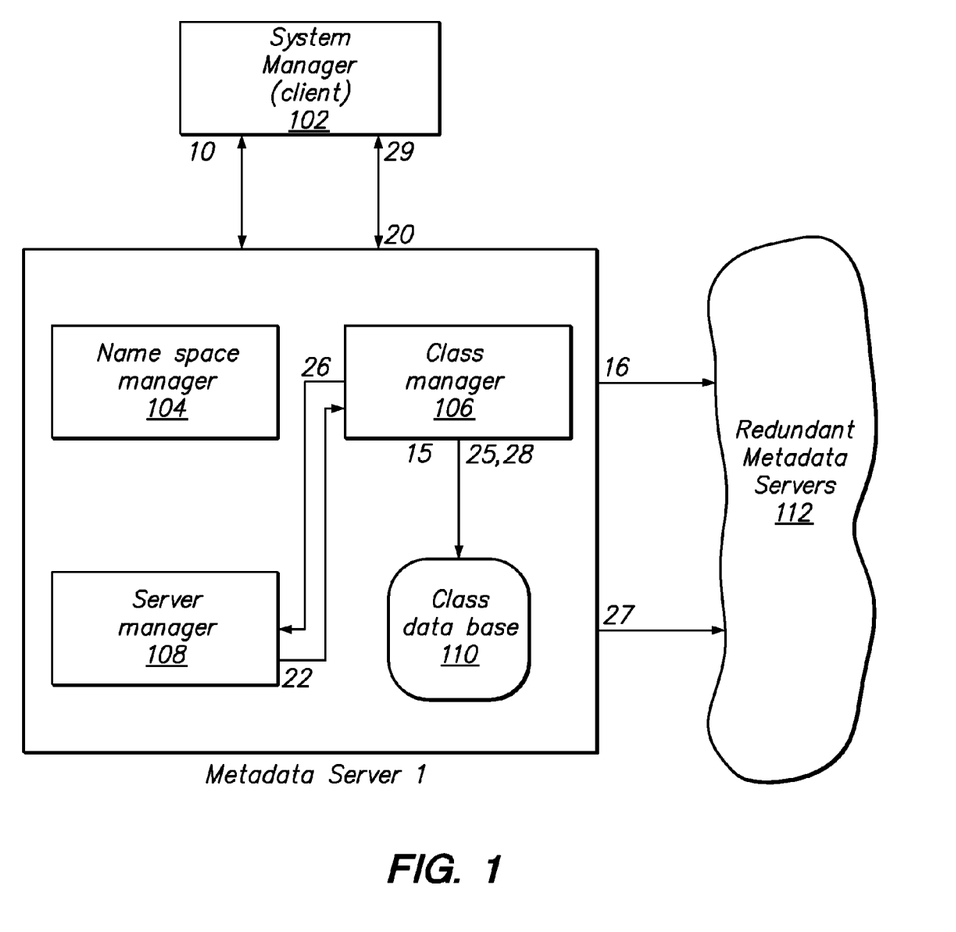
FIG. 1 shows a system manager client of a metadata server of a distributed storage system and a sequence of steps that may be taken, in one embodiment, to add a new server class attribute and define a new class.

FIG. 1 shows a system manager client 102 of a metadata server 1 of a distributed storage system and a sequence of steps that may be taken, in one embodiment, to add a new server class attribute and define a new class. In an embodiment, files are associated with classes of specific servers. The association of files to server classes provides a means for controlling the placement of data images within the cluster to specific server partitions. In an embodiment, a class is a set of servers that satisfy a set of server properties. For example, a class could be defined as all of the high performance servers within a cluster that are also connected to the highest bandwidth network switches. Any number of properties having any degree of complexity may define a class.

Figure 5A:
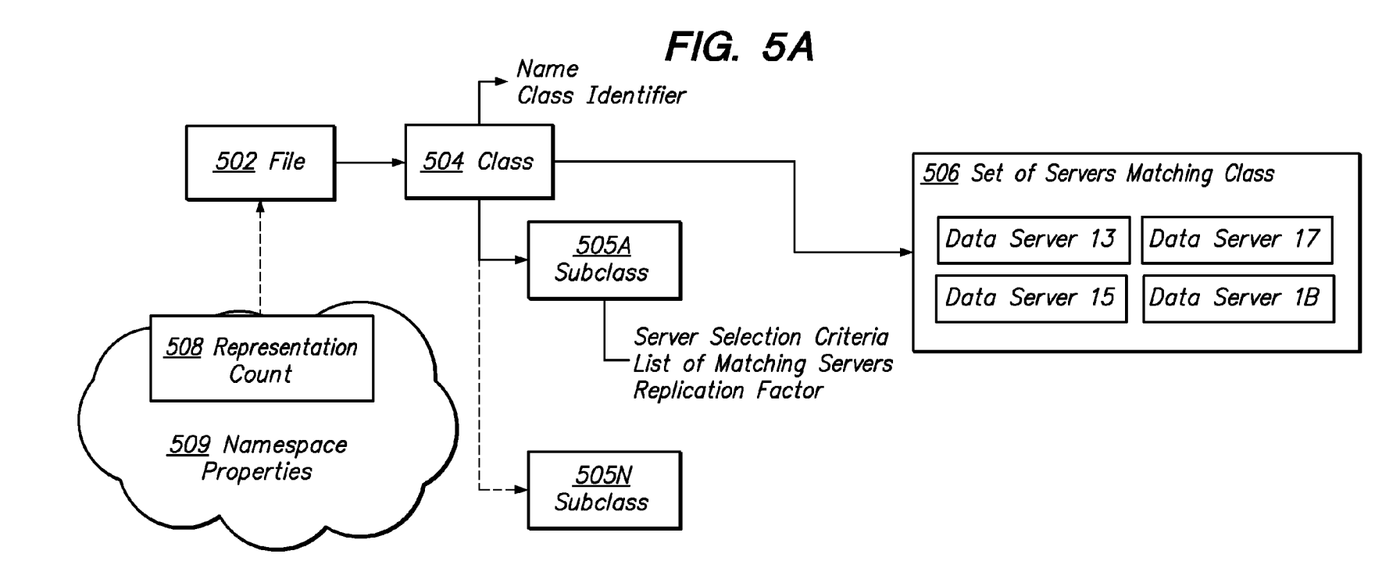
FIG. 5A illustrates logical relationships of a file, class, subclasses, and data servers.

FIG. 5A illustrates logical relationships of a file, class, subclasses, and data servers. A file 502 is associated by stored information in the metadata server 1 with a class 504. The class 504 is defined by one or more subclasses 505A, 505N. Any number of subclasses may be used. Collectively the class 504 and its subclasses 505A, 505N define a set 506 of servers that match the class. A client of the system of FIG. 1 can define the structure of FIG. 5A, and consequently the client can influence where the file 502 is stored by restricting storage to servers that are in the set 506 as determined by the class 504 and its subclasses.

In an embodiment, each class 504 is represented by a name and a class identifier. Each subclass is represented by server selection criteria, such as a database view command string, a list of servers currently matching the criteria and equivalent to set 506, and an optional representation count that can be used to determine a replication factor for data images mapped to the class, and a logical class identifier. The name, server selection criteria, and class identifier are shared as global state values among redundant metadata servers. For example, the metadata servers described in the system of US Patent Publication 2007-0214183-A1 may be used. Alternatively, an embodiment may use the Omneon MediaGrid storage system, commercially available from Omneon, Inc., Sunnyvale, Calif.

Classes may overlap. In an embodiment, a "share/no-share" property of a class indicates whether the class may overlap with others.

Figure 5B:
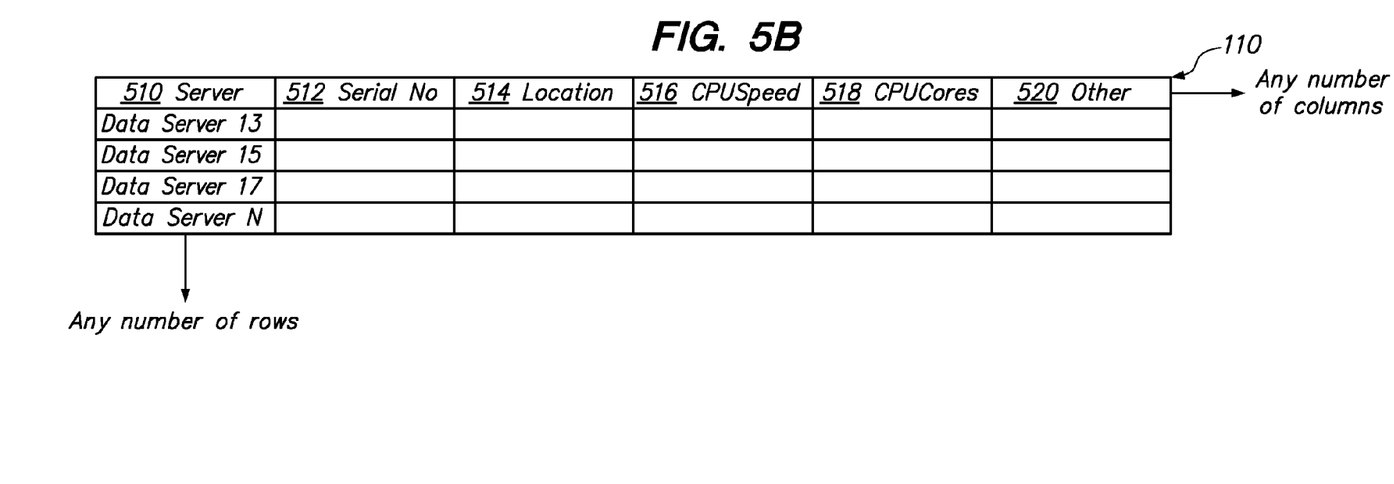
FIG. 5B illustrates an example server property database.

In an embodiment, a server property database 110 is maintained on each metadata server 1 in a distributed storage system. In the database 110, rows represent servers that are class members, and columns represent server properties. FIG. 5B illustrates an example server property database 110 in which column 510 identifiers servers, each of which is associated with a row, and columns 512, 514, 516, 518, 520 store properties of the server for the associated row. Any number of rows and columns may be represented in database 110. During startup, the database 110 is initialized by storing read-only system level properties for each available server in the columns 514, 516, 518, 520. Example system-level properties include serial number, network topology location, processor speed, and number of processor cores, as seen in FIG. 5B, but any properties may be used.

In an embodiment, the database 110 applies a sequence of commands, which are journaled on the metadata server, to make the database current and consistent with databases on other metadata servers controlling the server cluster. A transient list of abstract read/write server properties (e.g., server owner, repair priority) may be assigned to servers over time.

In an embodiment, all data of the file 502 is mapped to one class 504. The metadata stored in metadata server 1 for each replicated data image of a file contains the logical class identifier, thereby binding the location of file data to a particular class of servers. The metadata may be stored in local data storage of the metadata server 1, which is replicated to and synchronized with metadata data storage in all other metadata servers in the system. If a server change results in a repair to the data storage fabric, data is moved to other servers so that all file data remains in servers of the class to which the data is bound. As classes are redefined, or as files are moved between classes, the set of servers housing each data image for a file is reformed relative to the class. All such data movement is done local to the cluster, and does not require data movement between a client utility and the cluster servers.

In an embodiment, a nonzero representation count in a subclass 505A indicates the minimum number of servers from that subclass that must be represented in a replica set. Thus, a request to store data may indicate, using a nonzero representation count for a subclass 505A, an enforced replication factor for any file 502 mapped to that subclass 505A.

Subclasses 505A, 505N may affect data replication in a redundant data fabric as follows. When a class 504 consists of subclasses 505A, 505N all having a zero representation count, then the replication factor for data images mapped to that class is obtained from an inherited file property, such as replication factor 508 of namespace properties 509 as seen in FIG. 5A. Otherwise, the effective data image replication factor is the sum of all subclass representation counts; moreover, in this latter case, any subclass with a zero representation count is ignored during sequence generation and data fabric repair. Furthermore, the replication factor for a file can be individually modified only when the sum of all subclass representation counts of the associated class is zero.

The metadata servers use a message-based control path for communications to intelligent storage elements to collect dynamic storage availability statistics. The metadata servers calculate the availability of the data fabric with respect to each class.

As a result, clients of the storage system can specify where the data for a file is to be located within a potentially huge cluster of commodity servers by binding the file to a class identifier. Thus, using embodiments, control of placement of replicated data images in a redundant data fabric is provided on a per-file basis. This additional control enables users to further optimize access of data in distributed file system according to dynamic business needs.

With embodiments, clients of a distributed file system have control over how data is placed and maintained. Previous approaches using metadata servers generally have placed redundant data images on data servers by globally optimizing the availability selection criteria over all servers. With the embodiments herein, data placement and the use of optimized availability selection criteria can be applied locally to specific sets of servers. By binding each data image to a class, files can be placed on specific sets of servers as the files are written, or as the data fabric is repaired.

Some previous approaches have partitioned servers into static groups, typically aligned along power distribution boundaries, and replication has sought to distribute images globally by striding them over groups. The present approach complements static group striding methods. In particular, when classes overlay multiple groups, distribution is biased so that images are distributed over all groups in the overlay.

Using the techniques herein, client control of data placement enables a wide variety new uses for such a file system, including hierarchical data management and data access staging. For example, a video file in a class consisting of a few large capacity servers may be reassigned to a class consisting of many high performing servers configured only with RAM disks, just prior to performing transcoding or just prior to playing the file in a video network.

Embodiments also enable the development of intelligent cluster manager applications to monitor and control a cluster on a class basis without having to copy data in and out of the cluster. For example, a manager application can monitor file class assignments and re-assign files that have not been accessed recently to classes in order to maintain a specific amount of free space in frequently accessed classes. The manager application also could reassign additional servers to non overlapping classes that are nearly full.

2.1 Adding a Server Class Attribute and Defining a Class

FIG. 1 further shows a sequence of steps that may be taken, in one embodiment, to add a new server class attribute and define a new class.

Figure 6:
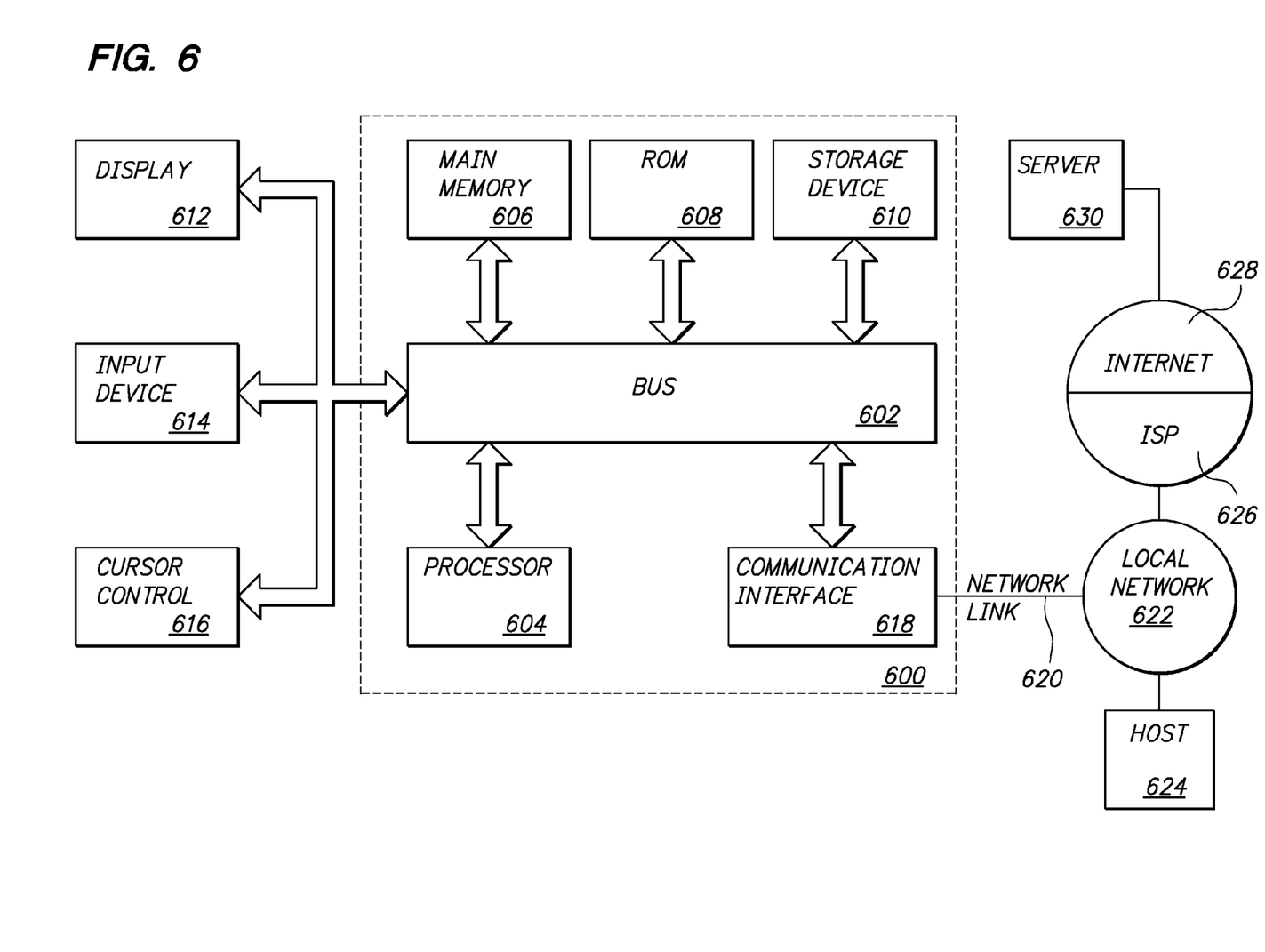
FIG. 6 illustrates a computer system upon which an embodiment may be implemented.

In an embodiment, a system manager 102 is coupled to a metadata server 1. The system manager 102 is a client of the metadata server 1. In various embodiments, there may be any number of metadata servers. For example, the architecture of US Patent Publication 2007-0214183-A1 may be used. Each metadata server 1 may be implemented using a general purpose computer system as shown in FIG. 6 in which the memory or local data storage stores program instructions or other software elements that implement the functions described herein. For example, metadata server 1 may comprise logic that implements a name space manager 104, class manager 106, server manager 108, and class database 110.

First the client makes a remote procedure request (10) to assign a class attribute to a set of servers. For example, the commands

```
attribute = "owner=demo"
servers = {server1-server30}
``` assign the owner attribute to "demo" to servers identified using identifier values server1 through server 30. The class manager 106 journals state data, and updates the class database 110. The attribute and server set are passed to other metadata servers (16). For example, the techniques to share data on a redundant metadata server ring described in U.S. Pat. No. 6,665,675 B1 may be used.

System manager 102 as client makes a remote procedure request (20) to define a new class by specifying the class name and set of subclass strings. For example, system manager 102 sends the following request:

```
name = "fastServerClass"
subclass1 = (processorSpeed=3GHz &&
    "owner = demo" &&
    "location=labRoom1)(representationCount=2)
subclass2 = (processorSpeed=3GHz &&
    "owner = demo" &&
    "location=labRoom2)(representationCount=2)
```

The example request indicates that servers associated with a class named "fastServerClass" comprise all 3 GHz servers in lab1 and lab2 that have been allocated for the owner "demo". In response to the request, class manager 106 uses the subclass criteria to identify a set of servers that satisfy the attribute criteria. Class manager 106 then sends the server set to the server manager 108 at (26). Subclasses may identify any desired criteria, such as processor speed, number of CPUs or CPU cores, the speed of a switch to which a server is coupled, location, read latency, write latency, etc.

The representation count values may be different in different subclasses. Thus, while the representation count is "2" in both subclasses of the example above, other embodiments may use different counts in different subclasses. Use of representation counts enables clients to indirectly specify, for example, that a file must have high availability. For example, high representation count values will result in storing the file with a high replication factor, so that the file can be delivered to more clients concurrently.

In response, the server manager 108 assigns a new class identifier for the servers and shares this identifier with all other server manager instances of other metadata servers 1 among the redundant metadata servers 112 at (27). The server manager 108 returns the class identifier to the class manager at (22).

In response, the class manager 106 updates the class database 110 at (28) and returns the class identifier to the system manager 102 at (29). Because the representation count values are "2," all subsequent file data associated with the class identifier will be replicated twice among the 3 GHz servers owned by "demo" in lab1 and twice among the 3 GHz servers owned by "demo" in lab2.

2.2 Writing Data to a File in a Class

In an embodiment, when a file is to be stored and the file has an association to a class, availability selection criteria is used to locate the best available servers in the class to house the data for the file. When the members of a class change, or when the association of a file is changed to a different class, all data for the affected files are re-replicated using only that part of the cluster that contains servers in the class.

Figure 2:
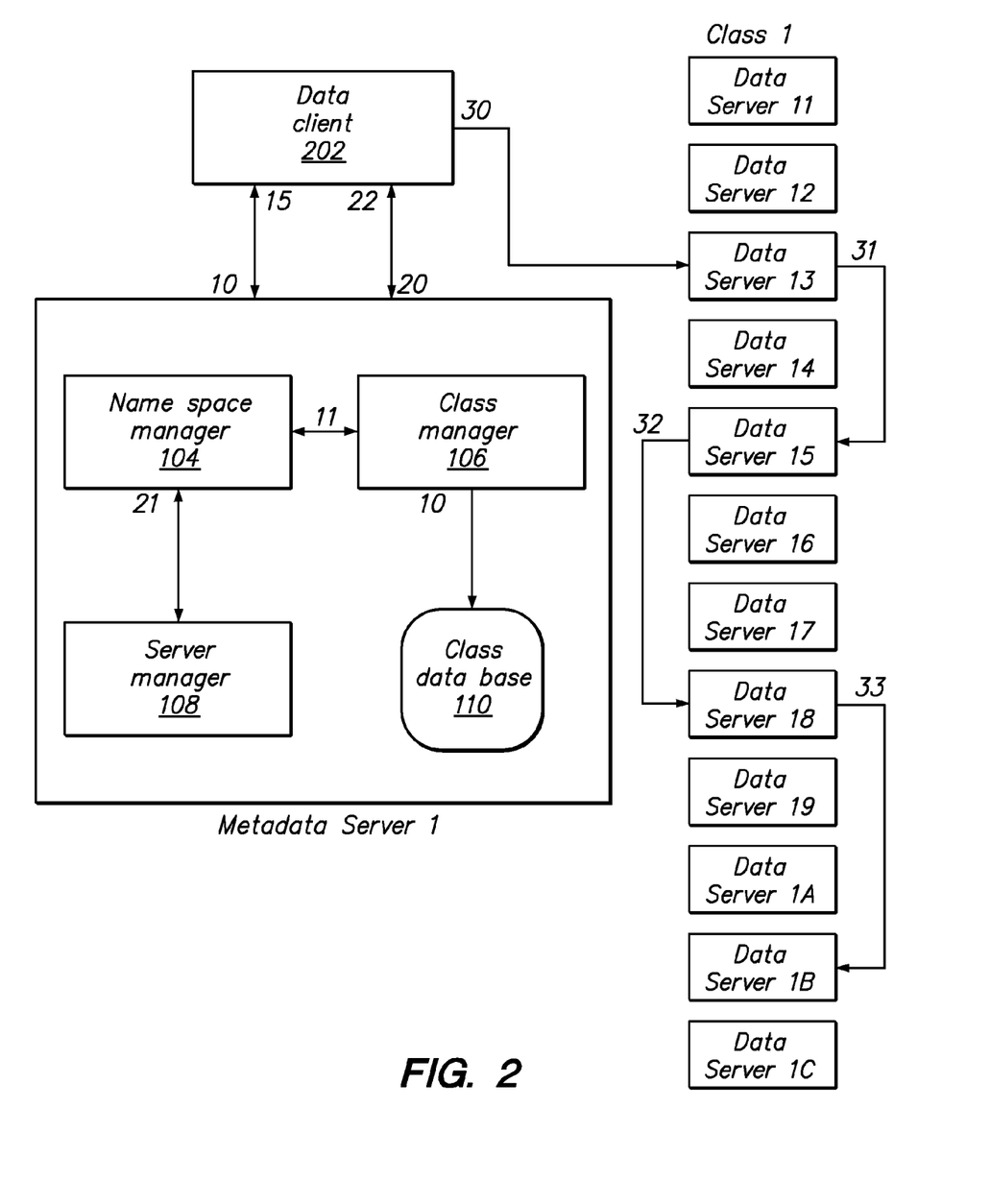
FIG. 2 shows a data client of a distributed storage system and an example sequence of steps taken to write data to a file in a specific class.

FIG. 2 shows a data client of a distributed storage system and an example sequence of steps that may be performed to write data to a file in a specific class.

Since servers supporting a massively distributed file system may simultaneously host parallel applications, the methods described herein can be used to control placement of applications executing within the cluster. Thus, the term "file" as used herein includes data files, application files including executables, and all other data that can be stored in a storage system.

In an embodiment, a data client 202 is coupled to the metadata server 1 and creates a file in a directory (10). The name space manager 104 assigns a class identifier for the directory to the file as an inherited property. The name space manager 104 sends a path name and class identifier to the class manager to bind the file to the class for subsequent reverse lookup files by class (11). The name space manager 104 returns a handle to the client (15).

The data client 202, which is unaware of any class definition, requests the network addresses of a set of servers to write to (20). The name space manager 104 requests (21) the server manager 108 for the "optimal" servers in the class for writes. Based on best availability criteria applied locally to the server members in the class, the server manager 108 returns the addresses and the replication factor to the client (22). The replication factor is determined by summing the representation counts for all subclasses.

Continuing the example above, at (30) the data client 202 sends data to a first data server 13 with instructions for storing and forwarding onto the other servers in the sequence. In response, the first data server 13, a second data server 15, and a third data server 18 each perform copy/forward operations, resulting in storing and forwarding data three more times (31, 32, 33).

2.3 Updating a Class

Figure 3:
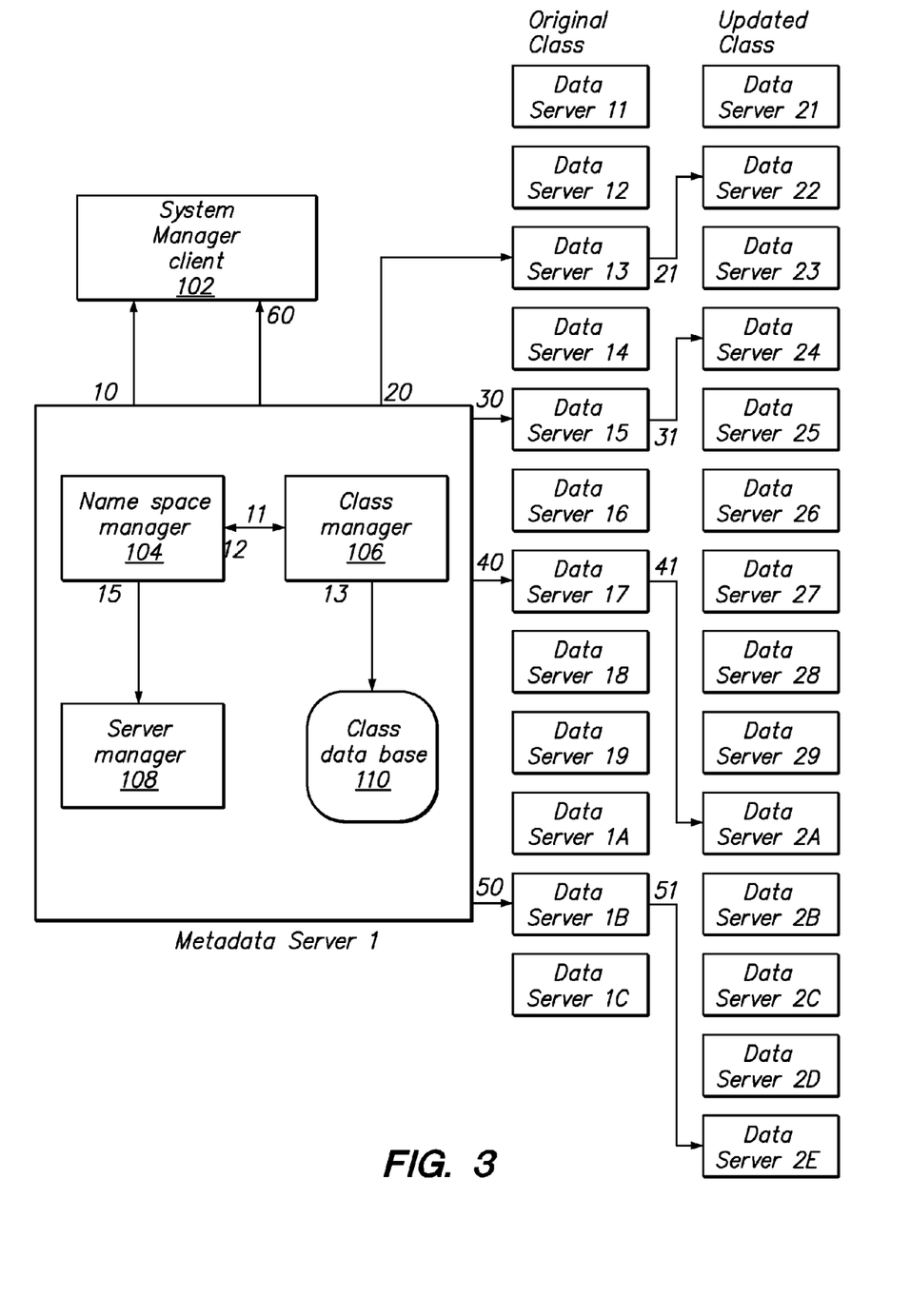
FIG. 3 shows a system manager client of a metadata server of a distributed storage system and an example sequence of steps taken to update an existing class.

FIG. 3 shows a system manager client of a metadata server of a distributed storage system and an example sequence of steps taken to update an existing class. In FIG. 3, a system manager 102 is coupled to metadata server 1 as in FIG. 1. FIG. 3 also illustrates a first class comprising data servers 11, 12, 13, 14, 15, 16, 17, 18, 19, 1A, 1B, 1C, and a second or updated class comprising different data servers 21, 22, 23, 24, 25, 26, 27, 28, 29, 2A, 2B, 2C, 2D, 2E.

For example, assume that a user desires to replace "lab1" with "lab3" in the representation of "fastServerClass" set forth above.

The system manager 102 acting as client makes a remote procedure request to update the subclass database string (10). In response, class manager 106 updates the class database locally, and updates other metadata servers 1 among the redundant metadata servers 112 (FIG. 1) with the new database string. In response, the server manager instances on all the metadata servers associate a new server set for the specific class as in FIG. 1.

The name space manager 104 performs a reverse lookup and reads the list of paths associated with the specific class. For each data chunk of each file, the name space manager 104 requests the server manager 108 to re-replicate the associated data images for the updated class (15). For each data chunk, the server manager 108 calculates the best available server set in the updated class and requests each server holding a specific data image (20, 30, 40, 50) to move the data in parallel to the optimally available server set for the updated class (21, 31, 41, 51).

If the updated class reflects a higher replication factor than before, then data movement from one to multiple servers is implied, and is performed. Because the server manager 108 maintains a broad view of server availability, some of the servers holding the original data image may be too busy to move data. In this case, the movement is done with a subset of servers (e.g., data server 13 and 17). As data movement completes, the server manager 108 updates the location of the data images on the metadata server 1. The data client 202 (FIG. 2) may receive an asynchronous event notification, or may poll the metadata server 1 to determine whether data movement is complete (60).

In an embodiment, data movement is contingent on available space in the updated class. If the servers in the updated class do not have available space, the metadata server will retry failed replications as the space dynamic parameters collected from each server in the class change over time.

2.4 Associating a File to a Different Class

Figure 4:
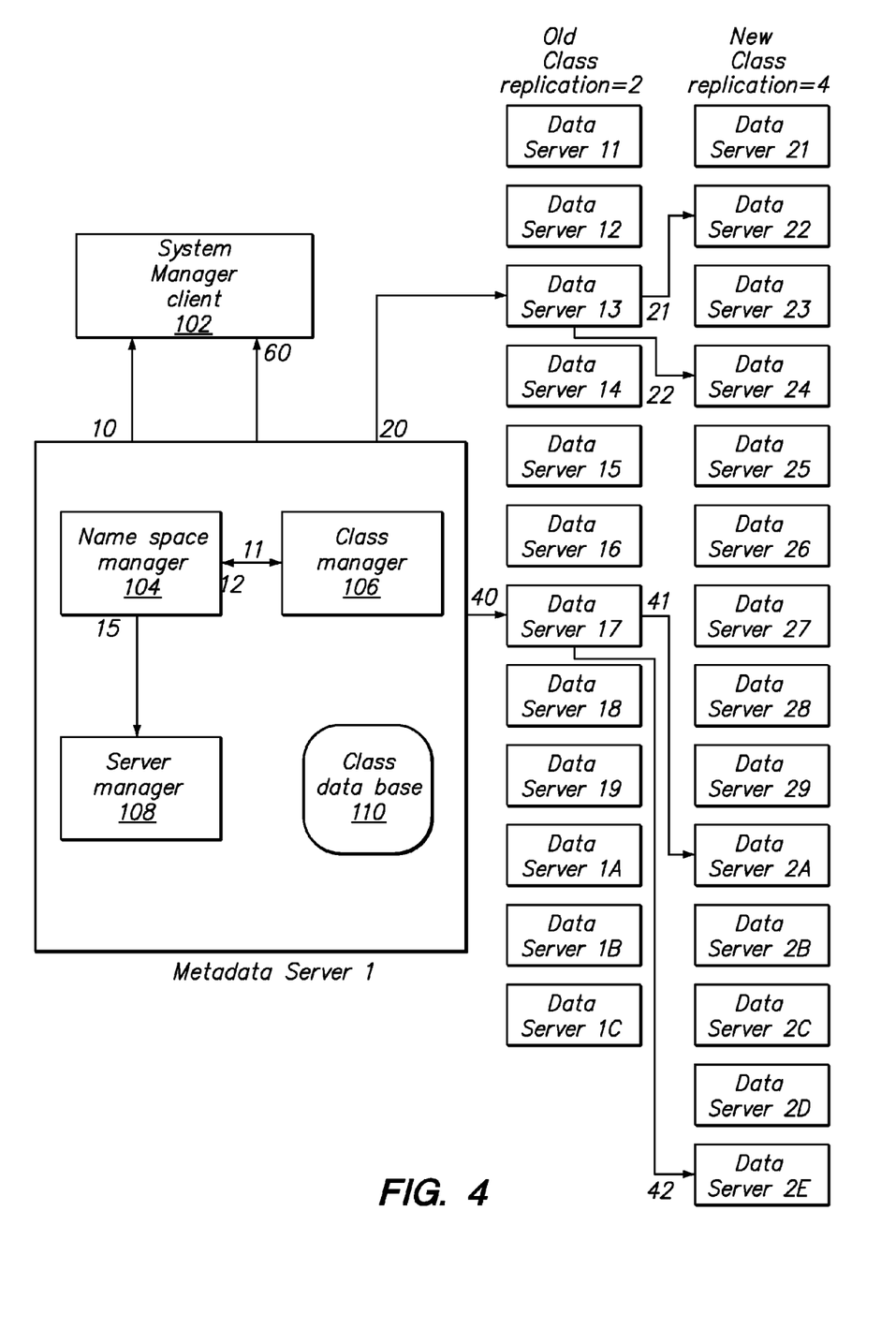
FIG. 4 shows a system manager client re-associating a file to a new or different class.

FIG. 4 shows a system manager client re-associating a file to a new or different class. A file may be re-associated with a new class or a different class for several reasons. For example, as the number of read accesses for a video file increases, the value of that file within a data storage cluster increases. By reassigning a frequently requested file to a class consisting of servers with fast central processing units and network interfaces, the cluster is able to service read requests so that the video is played out on more clients. If that class also has a higher representation count, then more copies of the file are distributed and maintained within the cluster, which also makes the file more available for clients reading it.

Reassigning the file to a new class can be performed as the file is being accessed. For purposes of this disclosure, the terms "re-associating" and "reassigning" are equivalent.

In an embodiment, system manager client 102 makes a remote procedure request to the namespace manager 104 to update the file attributes containing a new class identifier (10). The name space manager validates the new class with the class manager (11, 12).

For each data chunk associated with the file, the name space manager informs the server manager to reassign the data chunk to the new class identifier (15). For each data chunk, the server manager calculates the best available server set in the new class and requests each server holding a specific data image (20, 40) in the old class with an implied replication factor of 2, to move the data (in parallel) to an optimally available server set for the new class (21, 22, 41, 42) with a higher implied replication factor of 4, as shown just above Data Server 21.

3.0 Implementations Mechanisims—Hardware Overview

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus, comprising:
   a metadata store storing information about files that are stored in a distributed data storage system, and comprising a class database;
   one or more processing units;
   logic coupled to the processing unit(s) and to the metadata store and comprising stored sequences of instructions which, when executed by the processing unit(s), cause:
   receiving and storing in the class database a definition of a class of data storage servers comprising one or more subclasses each comprising one or more server selection criteria;
   associating the class with one or more directories of the data storage system;
   in response to a data client storing a data file in a directory of the one or more directories, binding the class to the data file, determining and storing a set of identifiers of one or more data storage servers in the system that match the server selection criteria, and providing the set of identifiers to the data client;
   wherein the set of identifiers identify one or more data storage servers for storing the data file; and
   automatically storing the data file on one or more first data storage servers that are identified in the set of identifiers.

2. The apparatus of claim 1, further comprising sequences of instructions which, when executed by the processing unit(s), cause receiving a representation count in the definition of the one or more subclasses, determining a replication factor for the data file based on a sum of the representation counts, and storing a plurality of replicas of the data file in the data storage servers according to the replication factor.

3. The apparatus of claim 1, further comprising sequences of instructions which, when executed by the processing unit(s), cause receiving a representation count of zero in the definition of the one or more subclasses, determining a replication factor for the data file based on a replication factor property of the data file that is inherited from a directory in which the data file was created, and storing a plurality of replicas of the data file in the data storage servers according to the replication factor.

4. The apparatus of claim 1, further comprising sequences of instructions which, when executed by the processing unit(s), cause determining and storing the set of identifiers based further on one or more best availability criteria that are applied only to the data storage servers in the system that match the server selection criteria.

5. The apparatus of claim 1, wherein the server selection criteria comprise processor speed, owner and location.

6. The apparatus of claim 1, further comprising sequences of instructions which, when executed by the processing unit(s), cause:
   receiving an updated definition of one or more of the subclasses comprising one or more updated server selection criteria;
   based on the updated definition, determining and storing an updated set of identifiers of one or more different data storage servers in the system that match the updated server selection criteria;
   causing automatically storing the data file only on one or more second data storage servers that are identified in the updated set of identifiers.

7. The apparatus of claim 1, further comprising sequences of instructions which, when executed by the processing unit(s), cause:
   receiving a representation count in the definition of the one or more subclasses, determining a first replication factor for the data file based on a sum of the representation counts, and storing a plurality of replicas of the data file in the data storage servers according to the first replication factor;

receiving an updated definition of one or more of the subclasses comprising one or more updated server selection criteria;

based on the updated definition, determining and storing an updated set of identifiers of one or more different data storage servers in the system that match the updated server selection criteria, and determining a second replication factor for the data file based on a sum of the representation counts in the updated definition;

storing the data file only on one or more second data storage servers that are identified in the updated set of identifiers, in a plurality of replicas according to the second replication factor.

8. The apparatus of claim 1, further comprising sequences of instructions which, when executed by the processing unit(s), cause:

receiving an updated file attribute for the data file that comprises an updated class identifier;

determining and storing an updated set of identifiers of one or more different data storage servers in the system that match the server selection criteria of the one or more subclasses of the class of the updated class identifier;

storing the data file only on one or more second data storage servers that are identified in the updated set of identifiers.

9. The apparatus of claim 8, further comprising sequences of instructions which, when executed by the processing unit(s), cause:

determining a replication factor for the data file based on a sum of representation counts of the one or more subclasses of the updated class identifier;

storing the data file only on the second data storage servers that are identified in the updated set of identifiers, in a plurality of replicas according to the replication factor.

10. A computer-readable storage medium comprising stored sequences of instructions which, when executed by one or more processing unit(s), cause:

receiving and storing, in a class database in a metadata store storing information about files that are stored in a distributed data storage system, a definition of a class of data storage servers comprising one or more subclasses each comprising one or more server selection criteria;

associating the class with one or more directories of the data storage system;

in response to a data client storing a data file in a directory of the one or more directories, binding the class to the data file, determining and storing a set of identifiers of one or more data storage servers in the system that match the server selection criteria, and providing the set of identifiers to the data client;

wherein the set of identifiers identify one or more data storage servers for storing the data file; and automatically storing the data file on one or more first data storage servers that are identified in the set of identifiers.

11. The computer-readable storage medium of claim 10, further comprising sequences of instructions which, when executed by the processing unit(s), cause receiving a representation count in the definition of the one or more subclasses, determining a replication factor for the data file based on a sum of the representation counts, and storing a plurality of replicas of the data file in the data storage servers according to the replication factor.

12. The computer-readable storage medium of claim 10, further comprising sequences of instructions which, when executed by the processing unit(s), cause receiving a representation count of zero in the definition of the one or more subclasses, determining a replication factor for the data file based on a replication factor property of the data file that is inherited from a directory in which the data file was created, and storing a plurality of replicas of the data file in the data storage servers according to the replication factor.

13. The computer-readable storage medium of claim 10, further comprising sequences of instructions which, when executed by the processing unit(s), cause determining and storing the set of identifiers based further on one or more best availability criteria that are applied only to the data storage servers in the system that match the server selection criteria.

14. The computer-readable storage medium of claim 10, wherein the server selection criteria comprise processor speed, owner and location.

15. The apparatus of claim 10, further comprising sequences of instructions which, when executed by the processing unit(s), cause:

receiving an updated definition of one or more of the subclasses comprising one or more updated server selection criteria;

based on the updated definition, determining and storing an updated set of identifiers of one or more different data storage servers in the system that match the updated server selection criteria;

causing automatically storing the data file only on one or more second data storage servers that are identified in the updated set of identifiers.

16. The computer-readable storage medium of claim 10, further comprising sequences of instructions which, when executed by the processing unit(s), cause:

receiving a representation count in the definition of the one or more subclasses, determining a first replication factor for the data file based on a sum of the representation counts, and storing a plurality of replicas of the data file in the data storage servers according to the first replication factor;

receiving an updated definition of one or more of the subclasses comprising one or more updated server selection criteria;

based on the updated definition, determining and storing an updated set of identifiers of one or more different data storage servers in the system that match the updated server selection criteria, and determining a second replication factor for the data file based on a sum of the representation counts in the updated definition;

storing the data file only on one or more second data storage servers that are identified in the updated set of identifiers, in a plurality of replicas according to the second replication factor.

17. The computer-readable storage medium of claim 10, further comprising sequences of instructions which, when executed by the processing unit(s), cause:

receiving an updated file attribute for the data file that comprises an updated class identifier;

determining and storing an updated set of identifiers of one or more different data storage servers in the system that match the server selection criteria of the one or more subclasses of the class of the updated class identifier;

storing the data file only on one or more second data storage servers that are identified in the updated set of identifiers.

18. The computer-readable storage medium of claim 17, further comprising sequences of instructions which, when executed by the processing unit(s), cause:

determining a replication factor for the data file based on a sum of representation counts of the one or more subclasses of the updated class identifier;

storing the data file only on the second data storage servers that are identified in the updated set of identifiers, in a plurality of replicas according to the replication factor.

19. A computer-implemented method, comprising:

receiving and storing, in a class database in a metadata store storing information about files that are stored in a distributed data storage system, a definition of a class of data storage servers comprising one or more subclasses each comprising one or more server selection criteria;

associating the class with one or more directories of the data storage system;

in response to a data client storing a data file in a directory of the one or more directories, binding the class to the data file, determining and storing a set of identifiers of one or more data storage servers in the system that match the server selection criteria, and providing the set of identifiers to the data client;

wherein the set of identifiers identify one or more data storage servers on which to store for storing the data file; and automatically storing the data file on one or more first data storage servers that are identified in the set of identifiers;

wherein the method is performed by one or more computing devices.

20. The method of claim 19, further comprising receiving a representation count in the definition of the one or more subclasses, determining a replication factor for the data file based on a sum of the representation counts, and storing a plurality of replicas of the data file in the data storage servers according to the replication factor.

21. The method of claim 19, further comprising receiving a representation count of zero in the definition of the one or more subclasses, determining a replication factor for the data file based on a replication factor property of the data file that is inherited from a directory in which the data file was created, and storing a plurality of replicas of the data file in the data storage servers according to the replication factor.

22. The method of claim 19, further comprising determining and storing the set of identifiers based further on one or more best availability criteria that are applied only to the data storage servers in the system that match the server selection criteria.

23. The method of claim 19, further comprising:

receiving an updated definition of one or more of the subclasses comprising one or more updated server selection criteria;

based on the updated definition, determining and storing an updated set of identifiers of one or more different data storage servers in the system that match the updated server selection criteria;

causing automatically storing the data file only on one or more second data storage servers that are identified in the updated set of identifiers.

24. The method of claim 19, further comprising:

receiving a representation count in the definition of the one or more subclasses, determining a first replication factor for the data file based on a sum of the representation counts, and storing a plurality of replicas of the data file in the data storage servers according to the first replication factor;

receiving an updated definition of one or more of the subclasses comprising one or more updated server selection criteria;

based on the updated definition, determining and storing an updated set of identifiers of one or more different data storage servers in the system that match the updated server selection criteria, and determining a second replication factor for the data file based on a sum of the representation counts in the updated definition;

storing the data file only on one or more second data storage servers that are identified in the updated set of identifiers, in a plurality of replicas according to the second replication factor.

25. The method of claim 19, further comprising:

receiving an updated file attribute for the data file that comprises an updated class identifier;

determining and storing an updated set of identifiers of one or more different data storage servers in the system that match the server selection criteria of the one or more subclasses of the class of the updated class identifier;

storing the data file only on one or more second data storage servers that are identified in the updated set of identifiers.

26. The method of claim 25, further comprising:

determining a replication factor for the data file based on a sum of representation counts of the one or more subclasses of the updated class identifier;

storing the data file only on the second data storage servers that are identified in the updated set of identifiers, in a plurality of replicas according to the replication factor.

* * * * *